Nov. 19, 1935.         C. E. GRIST         2,021,775
SCALE SIGNAL DEVICE
Original Filed Nov. 18, 1933      3 Sheets-Sheet 1
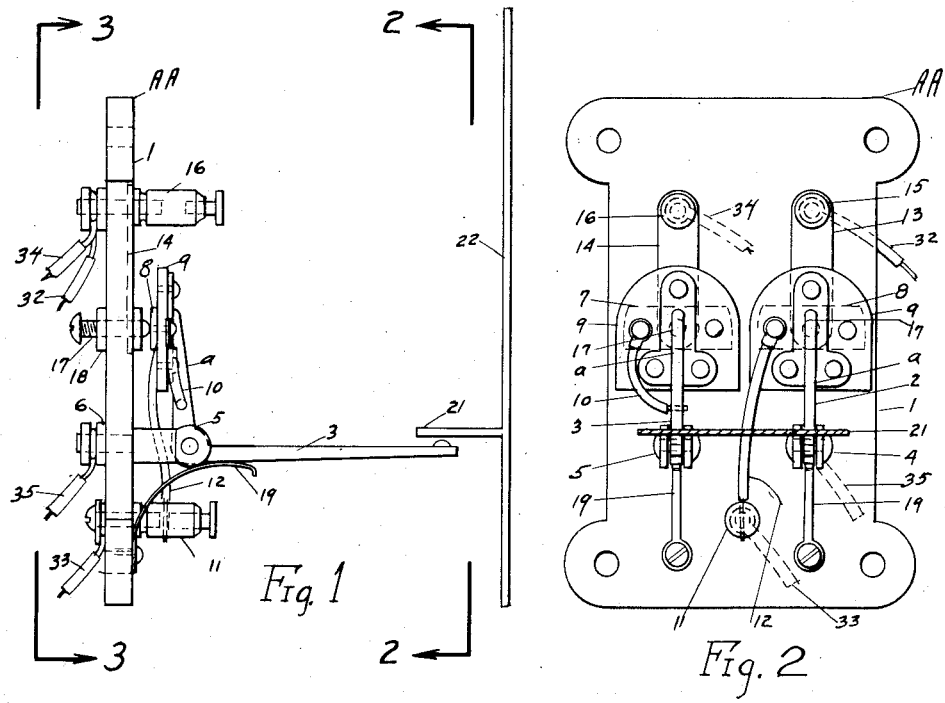
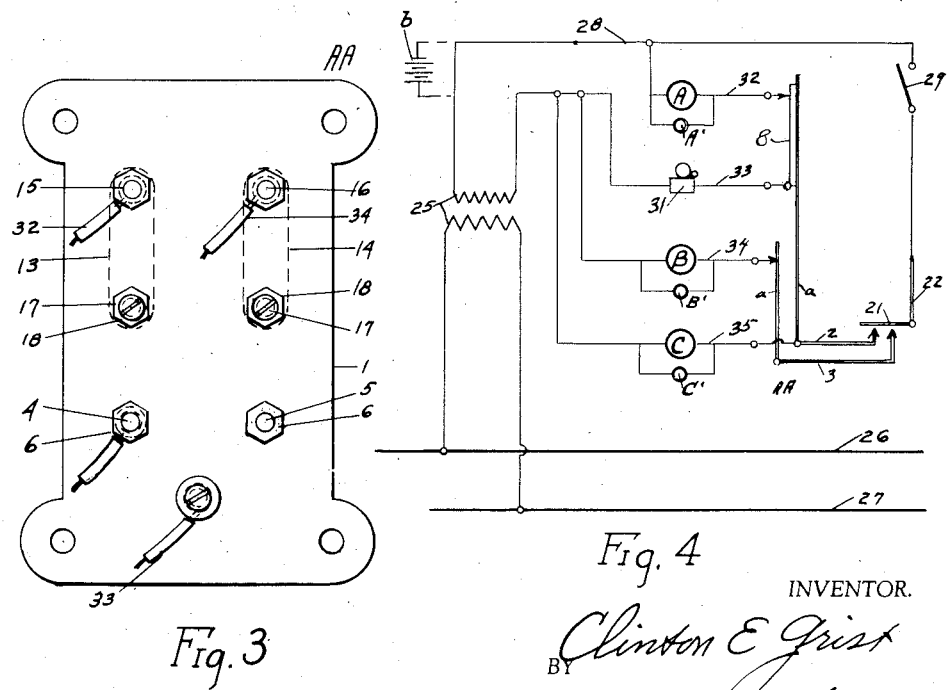
INVENTOR.
Clinton E. Grist
BY
Myron J. Diksman
ATTORNEY.

INVENTOR.
Clinton E. Grist
BY Myron J. Dikeman
ATTORNEY.

Nov. 19, 1935.  C. E. GRIST  2,021,775
SCALE SIGNAL DEVICE
Original Filed Nov. 18, 1933   3 Sheets-Sheet 3
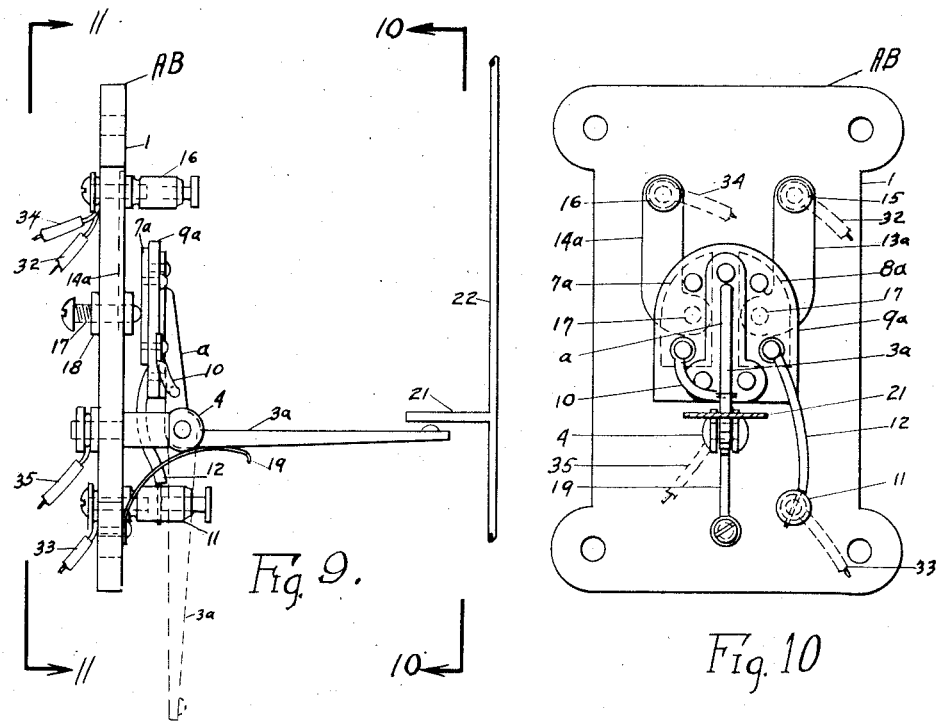
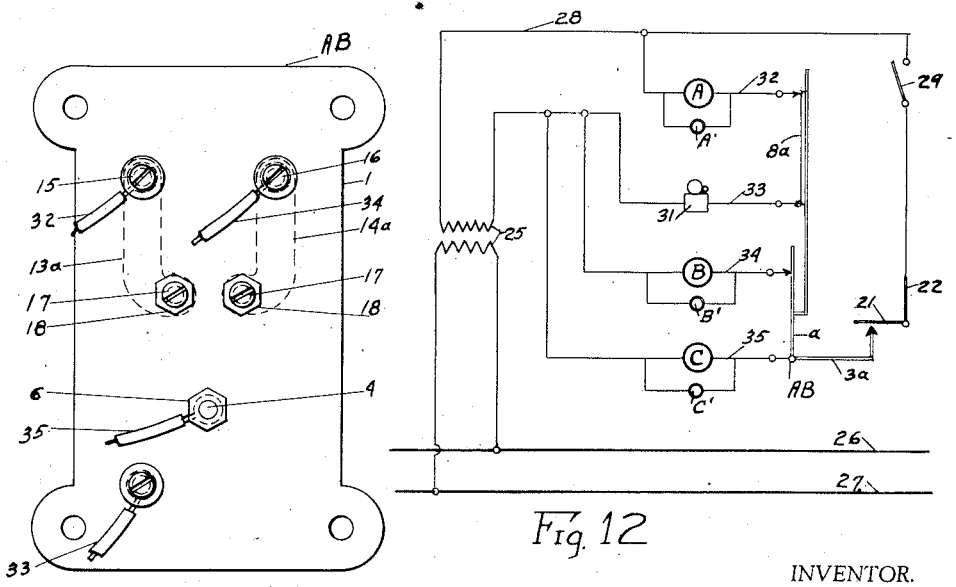
INVENTOR.
Clinton E Grist
BY Myron J Dikeman
ATTORNEY.

Patented Nov. 19, 1935

2,021,775

UNITED STATES PATENT OFFICE 2,021,775

SCALE SIGNAL DEVICE

Clinton E. Grist, Detroit, Mich.

Original application November 18, 1933, Serial No. 698,617, now Patent No. 2,009,691. Divided and this application June 23, 1934, Serial No. 732,020

6 Claims. (Cl. 177—311)

This invention relates to an electric signal device and is a division of my former patent application Serial No. 698,617, filed November 18, 1933, covering a similar scale signal unit.

The object of my invention is to produce an automatic electric signal means for indicating the weighing position of a scale beam during any weighing operation, and without observing the scale beam reading.

Another object is to provide an electric signal device that may be adapted to all types of scale weighing units or indicators, and that will produce different electric signals for each different scale beam position as the beam fluctuates under the varying loading condition.

A further object is to provide a scale signal device that will produce both visible and audible electric signals for some of the scale beam positions, and without effecting the scale operation.

A still further object is to produce an automatic electric scale signal device that is simple in construction, easily and efficiently operated and that can be manufactured at a very low cost.

These several objects are attained in the preferred form by the construction and arrangement of parts more fully hereinafter set forth.

Similar parts on all drawings are marked by similar numerals or letters.

Fig. 1 is an elevation of the electric contact unit showing a side view arrangement of the operating parts.

Fig. 2 is a plan view of the unit taken on the line 2—2 of the Fig. 1 showing the relative position of the contactor members.

Fig. 3 is a back view of the unit taken on the line 3—3 of the Fig. 1 showing the terminal circuit wire connections.

Fig. 4 is a wiring diagram of the device showing the electric connections and circuits for connecting same to the various signal units through the fluctuating scale beam.

Fig. 9 is an elevation of a modified form of contact unit, utilizing a single arm contact member in place of the double structure shown in the Figs. 1 and 2.

Fig. 10 is a side view of the modified form of unit, as taken on the line 10—10 of the Fig. 9, showing the general arrangement of the various parts and connections.

Fig. 11 is a back view of the unit as taken on the line 11—11 of the Fig. 9 showing the electric terminal connections for mounting the instrument within the various electric circuits connected with the operating scale beam.

Fig. 12 is a modified wiring diagram for the unit shown in the previous Figs. 9, 10 and 11 for connecting same operatively with the scale weighing member.

Figure 5:
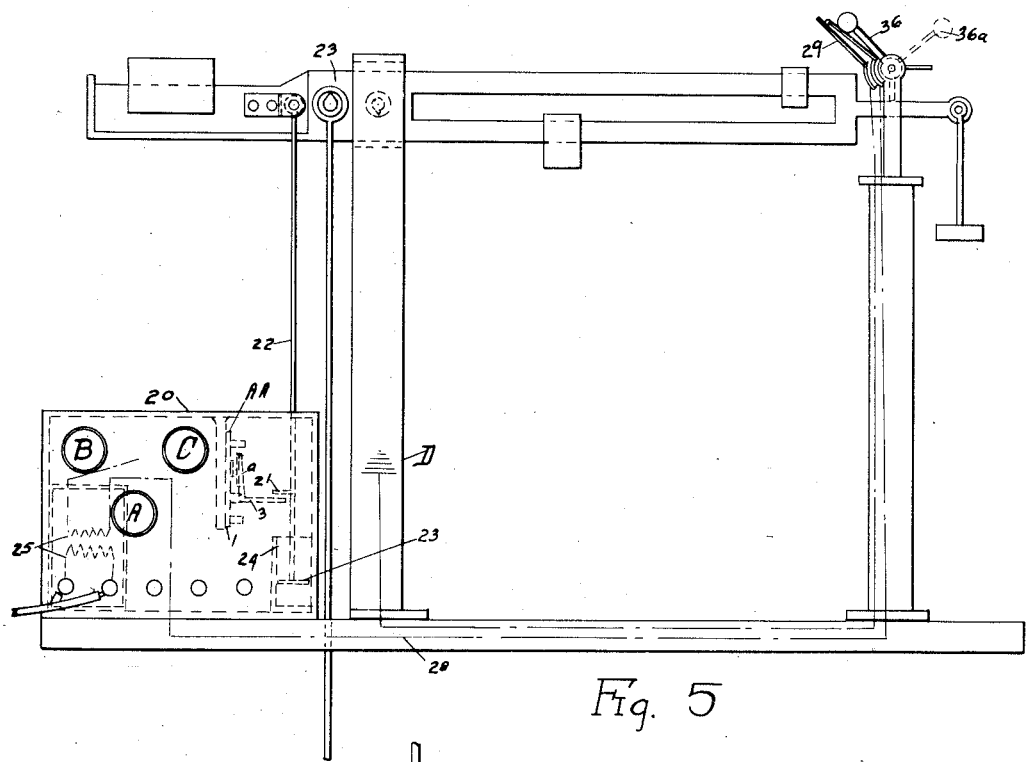
Fig. 5 is an elevation of a typical scale showing my signal device mounted thereon, and the general scale wiring arrangement.

While I have illustrated my invention herein as applied to the beam type of scale, it is to be understood that I also include the various modifications in both design and arrangement as may be required to adapt the signal control unit to the different types and kinds of scales or weight registering devices.

In general, my device comprises a multiple electric contact unit fixedly installed within a suitable casing member, together with various electric signal units and necessary transformer, all electrically connected, said casing being suitable for mounting on a scale or weighing unit frame and with the contactor unit operatively connected with some of the scale weighing movable members. The electric contactor unit comprises a suitable base member of insulating material, and is provided with separated L-shaped contact arms hingedly mounted thereon, positioned side by side yet operative in a vertical position, the arms being connected in separated electric signal circuits, operative in the closed arm positions or when the arms are displaced by an engaging contact plate positioned thereabove and connected movably with the scale weighing member. Each contact arm is provided with an interiorly positioned insulated terminal plate positioned to close on their respective contact terminals connected in the various signal circuits, the signals being operative by making or breaking of the respective electric circuits leading thereto, through the contactor unit.

I will now describe more fully the detailed construction of my device, referring to the drawings and the marks thereon.

The contactor unit (AA) comprises a base member 1 made of insulating material such as hard rubber or fiber, or any other suitable insulating material, and is provided with two L-shaped contact arms 2 and 3 hingedly mounted thereon by the hinge posts 4 and 5 respectively. The posts 4 and 5 are positioned in horizontal alignment across the base member, and securely attached thereto by the threaded nuts 6, and arranged with the connected contact arms 2 and 3 positioned with the extension arm sections $a$ parallel with the base face and with the opposite arm sections at right angles thereto, arranged side by side, and operative in vertical parallel planes. Each extension arm $a$ of said contact arms 2 and 3, is provided with a contact plate, 7 and 8 respectively, and each insulated from the arm member by an insulating block 9 mounted therebetween. The contact plate 7 is electrically connected to the contact arm 3 by the circuit wire 10, while the contact plate 8 is connected electrically to the terminal post 11 by the circuit wire 12. Fixedly mounted on the base 1 are two terminal bars 13 and 14, each positioned with one end beneath the respective contact plates 7 and 8, and with their opposite ends connected with the terminal posts 15 and 16 which are securely attached to the base 1. The terminal bars 13 and 14 are provided with adjustable contact screws 17 mounted through the inner ends thereof and attached to the base by threaded lock nuts 18, each positioned to engage the respective contact plates 7 and 8 when the contact arms 2 and 3 are closed thereon by engaging tension spring members 19 mounted on the base. The contactor unit (AA) is mounted in a casing 20, with the horizontal sections of the contact arms 2 and 3 positioned to engage the operating contact plate 21 mounted thereabove on a vertical operating rod 22 which is pivotally connected to the scale beam 23, all as indicated in the Fig. 5 of the drawings. The operating rod 22 is extended beneath the contact plate and is provided with a plunger head 23, fitted within a suitable dash pot chamber 24 of the casing 20, designed to restrain sudden movements of the operating rod and attached plate. The operating contact plate 21 is adjusted close to the ends of the contact arms, but without contact therewith, when the scale beam 23 is at perfect balance, but engaging and displacing both contact arms 2 and 3 when the scale unit is overloaded and the operating rod 22 and attached operating plate 21 is forced downward by the connected scale beam, and likewise breaking the circuit contact between the contact plates 7, 8 and their respective terminal contact screws 17.

Within the casing 20 is mounted a small transformer unit 25, such as may be required in case the electric current is supplied from a high tension electric circuit, through the wires 26 and 27, but this unit may be omitted if the electric source is from a battery $b$ as indicated in the Fig. 4 of the drawings. The transformer unit 25 is grounded in the scale frame D and connected operating rod 22, through the circuit wire 28 leading through the toggle switch 29 mounted on the outer end of the scale beam 23. Suitable colored electric signal lights A, B, and C are mounted within the casing walls, preferably amber, red and green lights respectively, the amber light indicating a perfect scale balance, the red light indicating an instant slight overload, and the green light indicating a continued scale overweight. Outside the casing 20, positioned at any desired location, near or far from the scale unit as may be desired, is a separate light signal casing 30 provided with duplicate colored lights A', B' and C' as in the former casing 20, also an electric signal bell unit 31 of any standard type, and preferably installed therewith or near by. In both signal light casings, the amber lights A, A' with the bell unit 31 are connected in the same electric circuit through the transformer unit 25 by the circuit wires 32 and 33, operative when the contact arm 2 is closed on the terminal screw 17 as the scale beam is in perfect balance. The red signal lights B and B' are connected in another separated electric circuit through the transformer unit 25 by the circuit wire 34, contact arm 3 and scale operating rod 22, operative for an instant only, when the contact plate 21 first contacts the arm 3 and before opening of the arm 3 from the engaging terminal contact screw 17, thus indicating a slight scale overweight, but if continued by a displacement of the contact arm 3, it will separate the contact plate 7 from the engaging terminal screw 17 and extinguish the red light signals B and B', and at the same time the green signal lights C and C' connected in another separated electric circuit through the transformer unit 25 by the circuit wire 35 leading to the contact arm 2 will become operative, indicating an excess overweight of the scale unit, and will continue until the scale beam balance is restored. This series of signal units, either visible, or audible, or both, will continue to indicate certain scale beam positions until disconnected by closing the toggle bar 36 to the dotted position indicated by the dotted lines 36a in the Fig. 5 of the drawings, and which breaks the circuit by opening the toggle switch 29.

Figure 8:
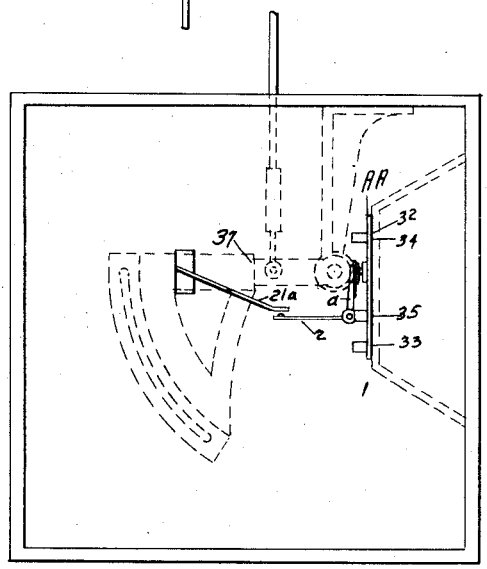
Fig. 8 is an elevation through a weightograph instrument showing the general arrangement of one of the operating parts having my device mounted thereon.
Figure 6:
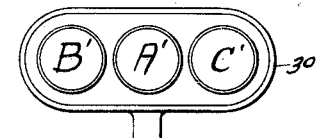
Fig. 6 illustrates a typical signal light unit adapted for installation within the wiring circuit at any chosen location, designed to operate in unison with the scale signal units.
Figure 7:
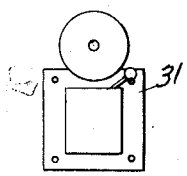
Fig. 7 is a plan view illustrating a typical electric bell also used as a signal unit for producing an audible signal.

Fig. 8 shows the same contactor unit (AA) as installed in a weightograph device, and is connected with the same signal units and same electric circuits as in the former case. The operating contact plate 21a being fixedly attached to the side of a rotatably mounted scale weighing member 37 as indicating in the drawings. The operation is exactly the same as in the former case.

The Figs. 9, 10 and 11 of the drawings show a modified form of contactor unit AB, having similar units throughout but formed with only a single contact arm 3a instead of the double unit previously shown. The contact arm 3a carries both sets of terminal plates 7a and 8a mounted thereon, insulated therefrom by the insulator block 9a. The base 1 is also provided with special terminal bars 13a and 14a as in the former case. The remaining parts of the structure are the same as previously described for the Figs. 1 and 2 of the drawings, and the electric connections and operation are exactly the same.

Having fully described my scale signal device, what I claim as my invention and desire to secure by Letters Patent is:

1. A scale signal device to be used in combination with a movable scale weighing member, comprising a base of insulating material having contactor operating means hingedly mounted thereon, a pair of adjacent, separated contact plates mounted on said contactor operating means, one of said plates being insulated therefrom, a pair of adjacent, separated terminal bars mounted on the base and positioned with one bar opposite each contact plate and engageable therewith when the contactor operating means is in its closed position, means provided for retaining said contactor operating means in its closed position when otherwise disengaged, an operating contact plate grounded in an electric circuit and mechanically connected to a movable scale weighing member and positioned to engage and displace the said contactor operating means and attached contact plates and connect same electrically with said contactor operating means by the movements of the connected scale member, means mounted on the base for connecting the insulated contact plate and its respective engageable terminal bar in a separated electric signal unit circuit, operative when said plate and terminal bar are closed together, means mounted on the base for connecting the opposite contact plate and respective engageable terminal bar in another separated electric signal unit circuit leading through the operating contactor means and engageable grounded operating contact plate, operative when all adjacent movable members are contacted together, and means mounted on the base for connecting a separated electric signal unit circuit leading through the contactor operating means and the engageable grounded operating contact plate, operative when said contactor operating means and contact plate are engaged electrically.

2. An electric signal device adapted for indicating scale weighing positions and used in combination with a movable scale weighing member, comprising a base of suitable insulating material having a pair of operating contactor arms hingedly mounted thereon, positioned side by side in parallel planes, a contact plate mounted on each of the said contactor arms, one of said plates being insulated from its respective supporting arm, a pair of terminal bars mounted on the base positioned opposite the respective contact plates, engageable therewith when the supporting contact arms are in their closed positions, spring means mounted on the base and engaging said contact arms for retaining them in the closed positions when otherwise disengaged, an operating contact plate movably mounted above the arm ends and grounded in an electric circuit and mechanically connected to a movable scale weighing member, said contact plate being positioned to engage and displace both contact arms simultaneously by the movement of the connected scale member, means mounted on the base for connecting the insulated contact plate and its respective engageable terminal bar in a separated electric signal unit circuit, means mounted on the base for connecting the opposite contact plate and its respective engageable terminal bar in another separated electric signal unit circuit leading through its respective contactor arm and the engageable operating contact plate, and means mounted on the base for connecting a separated electric signal unit circuit through one of the operating contactor arms and the engageable operating contact plate.

3. An electric signal device adapted for indicating scale weighing positions and used in combination with a movable scale weighing member, comprising a base member of suitable insulating material and having a pair of L-shaped operating contactor arms pivoted near the center and hingedly mounted thereon, positioned side by side and operative in parallel planes, a contact plate mounted on each of said contactor arms at a position near the base, one of said plates being insulated from its respective arm, a pair of terminal bars mounted on the base positioned opposite the respective contact plates, engageable therewith when said contact arms are in their closed positions, spring means mounted on the base and connected to each contactor arm for retaining same in their closed positions when otherwise disengaged, an operating contact plate movably mounted above the arm ends and grounded in an electric circuit and mechanically connected to a movable scale weighing member, said plate being positioned above the contactor arm ends to engage and displace both of said arms simultaneously with the scale weighing movement and to contact said arms electrically, means mounted on the base for connecting the insulated contact plate and its respective engageable terminal bar in a separated electric circuit having electric signal units electrically connected therein, operative when said plate and terminal bar are closed together, means mounted on the base for connecting the opposite contact plate and its respective engageable terminal bar in another separated electric circuit having electric signal units electrically connected therein, said circuit leading through the contactor arm and the engageable operating contact plate and operative when all adjacent movable members are contacted together, and means mounted on the base for connecting a separated electric signal circuit having electric signal units electrically connected therein through one of the contactor arms and the engageable operating contactor plate, operative when said arm and plate are contacted electrically.

4. A scale signal device to be used in combination with a movable scale weighing member, comprising a base of some suitable insulating material and having an operating contactor arm hingedly mounted thereon, a pair of adjacent but separated contact plates mounted on said contactor arm, positioned near the base, one of said contact plates being insulated from the arm, a pair of separated terminal bars mounted on the base positioned opposite the said contact plates, one opposite each plate and engageable therewith when said contactor arm is in its closed position, spring means mounted on the base for retaining the contactor arm in its closed position when otherwise disengaged, an operating contact plate grounded in an electric circuit and mechanically connected to a movable scale weighing member and positioned to engage and displace said contactor arm with the movement of the connected scale member and at the same time contact said arm electrically with said plate, means mounted on the base for connecting the insulated contact plate and its respective terminal bar in a separated electric signal unit circuit, operative when the two members are closed together, means mounted on the base for connecting the opposite contact plate and its respective engageable terminal bar in another separated electric signal unit circuit leading through the operating contactor arm and engageable operating contact plate, operative when all adjacent movable members are contacted together, and means mounted on the base for connecting a separated electric signal unit circuit through the operating contactor arm and engageable contact plate, operative when said arm and plate are contacted electrically.

5. A multiple electric contactor unit adapted for producing electric signals with scale weighing units and used in combination with various electric circuits having electric signal units mounted therein and with a movable scale weighing member, comprising a base of some suitable insulating material having a pair of operating contactor arms hingedly mounted thereon, positioned side by side and operative in parallel planes, a contact plate mounted on each of said contactor arms, one of said plates being insulated from its respective arm, a pair of terminal bars mounted on the base positioned opposite the respective contact plates engageable therewith when the contactor arms are in their closed positions, spring means mounted on the base and connected with the contactor arms for retaining them in their closed positions when otherwise disengaged terminal attaching means mounted on said base for connecting the insulated contact plate and its respective terminal bar in a separate electric circuit, operative when the plate and bar are closed together, terminal attaching means mounted on the base for connecting the opposite terminal bar and contact plate in another separated electric circuit, operative when said bar and its corresponding contact plate are closed together, an operating contact plate movably mounted above the contactor arm ends, engageable therewith for displacing said arm positions, means for grounding said operating contact plate in an electric circuit, means mounted on the base for connecting another separated electric signal circuit through one of the contactor arms and the connecting contactor plate grounded circuit, operative when said plate and arm are closed together, and means for connecting said operating contact plate with a movable scale weighing member.

6. An electric signal contactor unit to be used in combination with various electric signal unit circuits and with a movable scale weighing member, comprising a base of suitable insulating material having an operating contactor arm hingedly mounted thereon, a pair of adjacent, separated contact plates mounted on said contactor arm, positioned near the base, one of said plates being insulated from the arm, a pair of separated terminal bars mounted on the base positioned opposite the respective contact plates, engageable therewith when said contactor arm is in its closed position, spring means mounted on the base and connected to the operating contactor arm for retaining same in its closed position when otherwise disengaged, terminal attaching means mounted on the base for connecting the insulated contact plate and corresponding terminal bar in a separated electric circuit, operative when plate and bar are closed together, terminal attaching means mounted on said base and connecting the opposite terminal bar and contact plate in another separated electric signal circuit also operative when said bar and plate are closed together, an operating contact plate grounded in an electric circuit, and movably mounted above the contactor arm end and engageable therewith for displacing the contactor arm position, terminal attaching means mounted on said base for connecting a separated electric signal circuit through the contactor arm and the connecting operating contactor plate grounded circuit, and means for connecting said operating contact plate to a movable scale weighing member.

CLINTON E. GRIST.